July 10, 1956 W. A. KURT 2,753,876
DRAIN PLUG VALVE FLUSHING DEVICE
Filed March 15, 1955

INVENTOR.
BY WINFRED A. KURT
ATTORNEY

2,753,876

DRAIN PLUG VALVE FLUSHING DEVICE

Winfred A. Kurt, Royal Oak, Mich., assignor to Midwest Rubber Company, East Detroit, Mich., a corporation of Michigan Application March 15, 1955, Serial No. 494,443

4 Claims. (Cl. 134—167)

This invention relates to a drain plug valve flushing device, and more particularly to such a device having a substantially stiff, yet flexible, body member permitting positive insertion into drain lines of all types with a minimum of buckling, collapse or telescoping.

The device of this invention comprises a body member preferably made of rubber and formed at its principal and central portion into an X- or cross design. In the preferred form, the cruciform design comprises four equal convolutions or folds of the body member that expand into a true circular cross-section having a diameter substantially equal to the distance across the folds when in relaxed form. The body member, being of rubber, will further distend and inflate in similar section to a far greater diameter, as required. The folds, running longitudinally of the body member of the device, provide substantially stiff character to the device that permits facile insertion into drain lines, toilet chamber drains, sink and wash bowl lines, etc. Without such folds, the device would be very difficult to use satisfactorily, as the insertion must often take place, to be effective, at a considerable distance from the entry into the line. The body member is so arranged that when it is inserted into a drain line as a flushing device, a plug, or a valve, it will inflate and distend under normal conditions, without overfolding and lapping to prevent back flow and leaking. This occurs when the drain line diameter is greater than the distance across the folds. In drain lines whose diameter is less than the distance across the folds of the instant device, the body member, having a fluted tapering forward end, will expand and distend into full circular contact with the drain line at its forward end through the area of the fluted portion behind this forward end portion may be under compression or slightly overfolded or lapped. This important unsolved problem present in devices heretofore in use and patented is satisfactorily resolved by the novel and inventive configuration here shown, described and claimed. The body member of the device as arranged permits insertion of the device, without difficulty, into drain lines to points heretofore difficult, if not impossible, to reach by devices of this kind, without the aid of rods or sticks or other accessory means. And further, the device when operated inflates and functions in a most effective and efficient manner.

The device is further arranged with an outlet opening, integrally formed with the body member, that is substantially smaller in cross-sectional area than the inlet opening, also integrally formed. In this way, the body member expands very rapidly to full size because of the resistance at the outlet opening, upon being filled with water at the inlet end thereof. A suitable water line fitting is affixed to the inlet end of the body member, permitting its use with ordinary garden hose or the like.

Heretofore, devices of the type to which this invention relates have been subject to the defect that they are too flexible in relaxed form. Proper and effective insertion of a weak, yielding, collapsing pouch or bag into a drain line or toilet line is virtually impossible. All too often, there is overfolding of the sides of the bag or pouch, causing back flow and leaking when the drain line obstruction is met by the forceful flow of water out of the bag. This important defect is overcome by the instant construction.

Drain lines are effectively and efficiently opened up and relieved of obstructions by the instant device. Back flow and leaking are eliminated by the expansion of the fluted body member into a full circular, cylindrical body which readily adapts itself to the configuration of the drain line. The body member being of a fairly resilient material, rubber being preferred, the adaptation to the arrangement and surface of the drain line is most satisfactory. The fluted body of the device further enables the user to make a direct positive insertion of the device into every drain line, without collapse or telescoping of the body member.

These and other objects of the invention and features of construction will become more clearly apparent from the description given below. The terms used are for purposes of description and not of limitation. Referring now to the drawing annexed hereto and made an integral part hereof, showing a preferred embodiment of the invention, Fig. 1 is a vertical side elevation of the inventive device.

Figure 1:
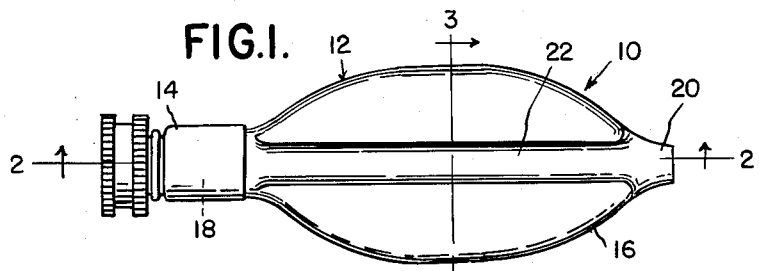
Figure 2:
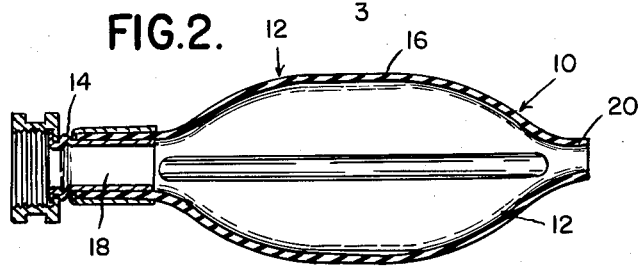
Fig. 2 is a horizontal longitudinal sectional view taken on the line 2—2 of Fig. 1.

As shown in the drawing, the device 10 comprises a body member 12, and a water or fluid line fitting 14. Body member 12 is a concave, hollow member and comprises a central fluted or convoluted portion 16, an inlet portion 18 of reduced cross-section, as compared to the central fluted portion, and an outlet portion 20, having a cross-sectional area substantially less than that of the inlet portion. Folds 22, arranged in an X- or cruciform design, are integrally formed in the portion 16.

The body member 12 is molded of rubber, preferably by the dipping process. It has been found that the thickness of the rubber is directly related to the stiffness characteristic of the folds 22. A thickness of $\frac{1}{16}$ inch for the walls and component elements of the body member 12 gives the device the necessary stiffness to permit positive, direct insertion of the device into all types of drain lines, without collapsing or telescoping the body member 12. A length of about 4¾ inches for the fluted portion 16 provides ample expansion and contact area for most drain lines, with a diametric distance across the folds, at their widest point, of about 2½ to 2¾ inches.

The outlet portion 20 may be greater or lesser in length, about ⅜ inch being preferred. The inlet portion 18 should be of a length suitable to accept a proper water line fitting 14, which fitting is positively anchored to the inlet portion by mechanical gripping thereof, by adhesives, or other suitable means or combination of means well known in the art. A garden hose fitting of ¾ inch size has been found very satisfactory for use with the device.

A water line 24, such as garden hose, is threaded into, or otherwise affixed to the fitting 14. When water is passed through the line 24 and into device 10, it fills the body member 12, due to flow resistance at the outlet portion 20, causing the folds 22 to swell and expand. As the fluted area 16 expands, upon being filled with water or other fluid, into a substantially circular sectional form, the portion of the fluted area which is straight becomes substantially cylindrical. As more fluid is entrapped in the body member 12, it distends and enlarges to fill the sides of drain line 26. The irregularities present in drain line 26, if there are any, are accepted by the rubber body member 12 and the line is completely sealed off by the body member from back flow or leaking.

If the drain line 26 is of lesser diameter than the body member 12 in its relaxed state, the forward end of the body member, i. e. the portion adjacent the outlet end, may be inserted into the drain line until it meets the diameter thereof. Upon being filled with water, the forward end of the body member 12 expands at the inserted portion to fully meet the circumference of the drain line, acting for that portion substantially as if the entire body member were inserted into the line, and closing it off to back flow and leaking. It will be noted that the forward end of the body member 12 is arranged in a taper toward outlet portion 20, permitting entry into drain lines of varying diameters.

The folds 22 are so designed that the material lying between the folds, when expanded, loses its involute form to cause the body member 12 to assume the form of approximately a circular cross-section. This form develops when the body member fills with fluid. As the internal fluid pressure builds up, the body member develops a circular cross-sectional form. Also, the body member 12, upon expansion and distension at its widest portion is straight, i. e. cylindrical in form for a distance, in order that it will make substantial land contact with the drain line surface. As the rubber body member 12 reaches the full diameter of the drain line, the amount of land contact therewith increases substantially because the rubber stretches longitudinally as the member's internal pressure increases, providing a very large force opposing return flow or displacement of the device.

Figure 3:
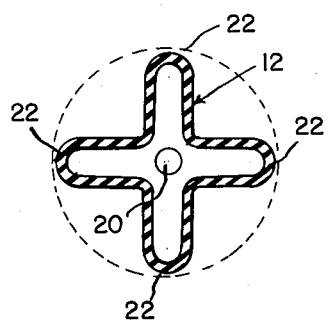
Fig. 3 is a vertical sectional view taken on the line 3—3 of Fig. 1.
Figure 4:
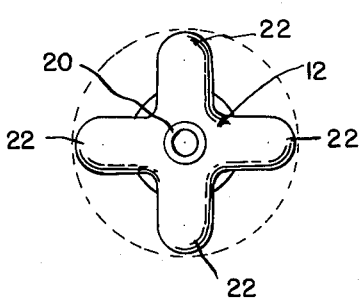
Fig. 4 is an end view, taken from the outlet end.
Figure 5:
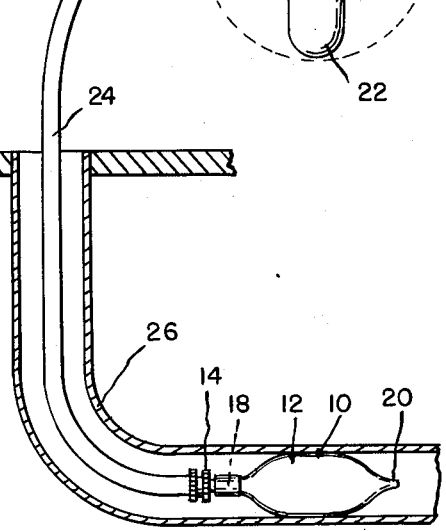
Fig. 5 is a vertical sectional view showing the device in use in a drain line.

The broken lines shown in Figs. 3 and 4 indicate generally the substantially circular shape to which the folds 22 will expand when the body member 12 fills with fluid. The peripheral length of the fluted-involute cruciform design is substantially equal to or slightly greater than the circumference of the circle formed by a diameter taken across the folds. When the fluted portion is inflated out of its cruciform design in its substantially circular cross-sectional form, the diameter is slightly greater than the distance across the folds. This is shown in Fig. 3 by broken lines.

In addition to flushing obstructions out of drain lines, the device 10 can also be used as a plug or valve in preventing back-up in drain lines, a condition often prevalent in congested communities having insufficient sewer drainage facilities. This is accomplished by simply passing water into the device 10 and maintaining a flow therethrough sufficient to resist reverse flow of the drain line water. Or, a plug inserted into the outlet end portion 20 will stop outflow of fluid from the body member 12, which, when inflated to drain size, acts as a plug valve to prevent back flow. This function of the device is important where sewer back-up has been a constant problem.

It will be recognized that a fluted or convoluted form comprising three (3) or more folds or convolutions may be employed, as well as the four-fold form above described. In order to provide the necessary stiffness characteristic required for drain line insertions, the convolutions or folds should be spaced apart from each other by a valley or trough integrally formed of the flexible material. This construction imparts such stiffness as the device requires for satisfactory use. The depth of the valleys or involutions between the folds is related to the stiffness characteristic of the body member and to the length of the arc between the crests of the folds when the body member is fully filled with fluid prior to distension. These two features of construction are determined, in part, by the wall thickness of the body member in the fluted area and by the depth of the valley between the flutes.

Often more than four folds may be desirable, in order to obtain a greater ratio between the inflated diameter and the relaxed diameter. By adding folds or convolutions with their intermediate valleys, the normal expansion of the body member upon filling will produce a cross-sectional diameter somewhat greater than the diameter of the body member in its relaxed state. This increase in size occurs before distension of the body member. Therefore, by increasing the number of folds a much greater filled diameter may be achieved for a particular relaxed diameter than with a lesser number of folds.

Having described my invention in its simplest terms, it is to be understood that the various features of construction may be changed and varied in greater or lesser degree without departing from the essence of the invention or the scope of the appended claims.

I claim:

1. A drain plug valve flushing device comprising a longitudinally fluted expandable concave hollow body member of resilient flexible material tapering toward inlet and outlet portions at the ends thereof, a fitting mounted on said inlet portion for connection to a source of fluid, said inlet portion having an opening therethrough into said body member of substantially larger cross-sectional area than the opening through said outlet portion, said body member having a portion intermediate said outlet and inlet portions arranged in a cruciform design when in relaxed state, said body member having a stiffness characteristic proportional to wall thickness whereby said cruciform design is substantially constantly maintained prior to filling said body member with fluid, sufficient to prevent collapse and telescoping of said body member as it is propelled along through a drain line in flushing position, the cross-sectional peripheral length around said fluted cruciform design being substantially equal to the circumference of a circle having a diameter equal to the distance across aligned folds, said fluted body member being substantially straight for a portion of its length and expandable at this portion into a cylinder when said body member is filled with fluid.

2. A drain line plug valve flushing device comprising a longitudinally fluted hollow inflatable body member of resilient flexible material having a stiffness characteristic proportional to wall thickness sufficient to prevent collapsing and telescoping when inserted into and propelled along through a drain line in flushing position, said body member tapering toward inlet and outlet portions at the ends thereof, a fitting mounted on said inlet portion for connection to a source of fluid, said inlet being substantially larger in cross-sectional area than said outlet, said body member having a fluted portion intermediate said portions arranged in cruciform design when in relaxed state, said fluted portion having said stiffness characteristic in its relaxed state, being inflatable when said body member fills with fluid into a substantially circular section, and being distensible in size to make full contact in a plane substantially normal to the longitudinal axis of said fluted portion with said drain line.

3. A drain line plug valve flushing device comprising a body member and inlet and outlet portions at the ends of said body member, said body member having a longitudinally fluted, hollow, inflatable portion of resilient flexible material, said fluted portion being arranged in cruciform design for four folds in planes normal to each other and having a stiffness characteristic proportional to wall thickness sufficient to prevent collapse and telescoping of said member when inserted into and propelled along through a drain line in flushing position, said body member tapering toward said inlet and outlet portions, said inlet portion being adapted to connect to a source of fluid to fill and inflate said member, said inlet being substantially larger in cross-sectional area than said outlet, said fluted body member being inflatable into a substantially cylindrical section in at least a portion thereof when in contact with the interior surface of a cylindrical drain line.

4. A drain plug valve flushing device comprising a body member having inlet and outlet portions at the ends thereof, said body member having a longitudinally fluted hollow inflatable portion of resilient flexible material, said fluted portion being arranged in cross-section in a symmetrical manner with radially extending folds having valleys therebetween providing a stiffness characteristic to said body member sufficient to prevent collapse and telescoping of said member when inserted into and propelled along through a drain line in flushing position, said stiffness characteristic being proportional to wall thickness and being a function of said fluted design, said body member tapering toward said inlet and outlet portions, said inlet portion having a fluid connection fitting thereon to connect to a source of fluid to fill and inflate said member, said inlet opening being substantially larger in cross-sectional area than said outlet opening, said fluted body member being inflatable into a substantially cylindrical section in at least a portion thereof when in contact with the interior surface of a cylindrical drain line.

References Cited in the file of this patent

UNITED STATES PATENTS

| | | |
|---|---|---|
| 329,773 | Perry | Nov. 3, 1885 |
| 718,121 | Harris | Jan. 13, 1903 |
| 1,180,182 | Petersen | Apr. 18, 1916 |
| 1,848,269 | Petersen | Mar. 8, 1932 |
| 1,906,151 | Goodman | Apr. 25, 1933 |

FOREIGN PATENTS

| | | |
|---|---|---|
| 681,448 | Great Britain | Oct. 22, 1952 |